United States Patent
Murphy (10) Patent No.: US 8,676,426 B1
(45) Date of Patent: Mar. 18, 2014

(54) AUTOMATIC GUIDED VEHICLE SYSTEM AND METHOD

(75) Inventor: Christopher John Murphy, Ann Arbor, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 13/597,535

(22) Filed: Aug. 29, 2012

(51) Int. Cl.
  *G01C 22/00* (2006.01)
  *B60T 7/16* (2006.01)
  *B64C 13/18* (2006.01)

(52) U.S. Cl.
  USPC .............. 701/23; 180/167; 180/168; 318/587

(58) Field of Classification Search
  USPC .............. 701/23; 180/167, 168, 169; 318/587
  See application file for complete search history.

(56) References Cited

U.S. PATENT DOCUMENTS

| | | | | |
|---|---|---|---|---|
| 4,990,841 A * | 2/1991 | Elder | ............................ | 318/587 |
| 5,191,528 A * | 3/1993 | Yardley et al. | .................. | 701/23 |
| 5,281,901 A * | 1/1994 | Yardley et al. | ................ | 318/587 |
| 5,347,456 A | 9/1994 | Zhang et al. | | |
| 5,434,781 A * | 7/1995 | Alofs et al. | ...................... | 701/23 |
| 5,467,084 A | 11/1995 | Alofs et al. | | |
| 6,336,064 B1 | 1/2002 | Honkura et al. | | |
| 6,437,561 B1 | 8/2002 | Bartingale et al. | | |
| 6,971,464 B2 * | 12/2005 | Marino et al. | ................. | 180/167 |
| 2008/0015756 A1 * | 1/2008 | Schmidt | .......................... | 701/50 |

* cited by examiner

*Primary Examiner* — Thomas Black
*Assistant Examiner* — Tyler Paige
(74) *Attorney, Agent, or Firm* — Dickinson Wright PLLC (57) ABSTRACT

An apparatus and method for guiding an automatic guided vehicle along a magnetic pathway and more specifically to an apparatus and a method capable of accurately and precisely following a weak magnetic field emitted by a substantially continuous passive magnetic marker having route junctions.

15 Claims, 9 Drawing Sheets

Detector Over Uniformly Magnetized Floor

AUTOMATIC GUIDED VEHICLE SYSTEM AND METHOD

TECHNICAL FIELD

The present invention is directed to an apparatus and method for guiding an automatic guided vehicle (AGV) along a magnetic pathway and more specifically to an apparatus and a method capable of accurately and precisely following a weak magnetic field emitted by a substantially continuous passive magnetic marker having route junctions.

BACKGROUND OF THE INVENTION

AGVs having automated guidance systems and thereby capable of operating without a human operator are increasingly common in industrial facilities. AGVs are used for a variety of tasks and functions, of which the most common function is to transport material along predetermined routes. To ensure precise and accurate guidance, AGVs use many guidance methods, including dead reckoning, electrified guide wires, optical systems, inertial guidance systems, magnetic markers, as well as a variety of other systems. Each of these systems has a variety of drawbacks, typically related to system cost and complexity. The largest components of the system costs are the initial installation costs and the cost of each AGV. Issues related to the complexity of the system typically include limited guide path revision flexibility, high costs associated with any guide path revisions, complex and heavy processor use during operation, and for some systems, limited operational accuracy.

In an electrified guide wire system, a conductive wire is buried in the floor of a facility and produces a strong magnetic field. More specifically, the AGV's guidance system senses and tracks an active magnetic field generated by current passing through the buried wire. These active magnetic fields are very easy to accurately and precisely track during operation and therefore have minimal AGV costs in comparison to other types of guidance systems that require more complex sensors and control units on the AGV. However, the initial installation costs of these electrified guide wire systems within the facility in which the AGVs operate are extremely high in comparison to other guidance systems and an electrified guide wire system has extremely limited guide path revision flexibility and high costs associated with any such revisions to the guide paths. More specifically, any change in a route the AGV follows requires tearing up the floor of the facility, removing existing electrified guide path wires and replacing them with rerouted guide path wires, all resulting in significant inconvenience or down time for the facility. As manufacturing and distribution facilities are increasingly implementing flexible techniques to allow switching between products being produced or distributed, the AGVs in these facilities are commonly using optical or inertial guidance systems, which do not require extensive facility renovations every time a minor change is made to the guide path of the AVGs.

Optical guidance systems have made significant strides in improved accuracy, but typically require expensive sensors and controllers with substantial processing power to process the graphical images used in guidance of the AGV, which increases the cost and complexity of each AGV. Inertial guidance systems, similar to optical guidance systems, have significantly improved their capabilities, however, inertial guidance systems using encoders and gyroscopes also typically require significant processing power. As such, the guidance systems for these AGVs are generally expensive and complex in comparison to the guidance systems for AGVs that follow an electrified guide wire. While optical and inertial guidance systems do not require tearing up the floor of a facility to make route changes, similar to most guidance systems, any route changes may require substantial time and costs for the system to learn the new route. In optical and inertial guidance systems, at least one AGV typically must be taught the new route and in some systems, a new map of the facility must be created, which can be time consuming and require specialized expertise. As such, the components on the AGV relating to the guidance system may have substantially greater costs and complexity than similar components on any AGV in an electrified guide wire system. The costs associated with the AGVs learning new routes are much higher for inertial and optical guidance systems than electrified guide wire systems, when the costs relating to facility renovations related to new routes are excluded. In comparison to AGVs that follow electrified guide wires, the advantage of AGVs with inertial and optical guidance systems is that they allow high guide path flexibility, and route changes require little facility renovations. For example, at most, some optical guidance systems only require new markers, targets or reflectors to be added to the facility in relation to any guide path changes.

As the use of AGVs in the material handling industry has increased, there has been a corresponding growth and desire for lower cost AGVs that include flexibility regarding route revisions within a facility, similar to inertial and optical guidance systems, with the lower sensor costs and ease of learning new paths for AGVs used in following electrified guide wire systems. In an attempt to meet these desires, some manufacturers are using AGVs that follow a passive magnetic pathway, which instead of using an expensive buried electrified guide wire, uses passive magnetic materials typically applied to the floor of the facility. Examples of such passive magnetic materials include magnetic tapes, paints, bars, markers and other magnetic materials. Due to the weaker magnetic field generated by these passive magnetic materials, some AGVs have experienced issues in accurately and precisely tracking the guide paths formed by the passive magnetic materials. While the installation costs are much lower and route revisions are much cheaper than electrified guide wire systems, the weaker magnetic fields of these passive magnetic materials may limit the ability of traditional magnetic sensors on the AGV, previously used with electrified guide wires, to determine the precise location of the weaker magnetic signal, especially in facilities having strong background or ambient magnetic fields.

Two types of passive magnetic markers are commonly used, continuous magnetic pathways or discrete magnetic markers. One problem with discrete magnetic markers is that the AGV must be presumed to be in alignment with the path defined by the discrete magnet markers. Therefore, the AGV must first be manually aligned very carefully with the pathway of magnet markers. During operation, if errors compound, such as a heading error increasing to a point where correction is not possible, the sensors on the AGV may be too far displaced from the next marker to obtain a valid reading of the next marker. Missing or displaced magnetic markers are also problematic, as once the AGV is misaligned with the actual path, most current methods of using discrete markers are unable to correct the AGV's path sufficiently to detect the next correctly located discrete marker in the pathway. More specifically, even when the AGV is traveling along a straight pathway, if the next expected magnetic marker is displaced to one side from its proper position, the AGV may initiate a turn based on the location of the displaced marker, which may cause the heading of the AGV to be too far deviated from the correct pathway to locate the subsequent properly placed marker. These issues are particularly acute in areas where an AGV must make a turn.

Methods of using discrete magnet markers typically require a variety of external apparatuses and complex methods to follow changes in the path such as curves and junctions or divergences in the path. To adjust and correct for potential issues, many methods have been proposed that encode information about path changes in the magnetic markers. These encoding systems are typically limited to a small amount of information and may even require many individual magnets to form a single marker to encode enough information. The requirements for these individual, specialized magnets increases the cost of installation and overall complexity of the system, while the practicality of the system is limited in view of the limited amount of information capable of being encoded.

While some systems have attempted to replace the discrete magnetic markers in turns with a continuous marker, such as a magnetic bar, these bars are typically expensive to install, may require facility renovations and may require expensive custom radius magnetic bars in the turns. To reduce the initial installation cost, eliminate the problems described above with discrete markers and provide increased flexibility relating to changes in the routes of the AGVs within a facility, some systems are using continuous magnetic markers such as magnetic tape, magnetic paint, and adhesive materials having magnetic properties or any combination thereof. However, due to the typically weaker magnetic fields emitted by these continuous markers, as compared to electrified guide wires and even discrete magnetic markers, the magnetic sensors used on these AGVs have increased in cost and the processing power required for tracking has also increased to ensure accurate and precise tracking similar to the tracking obtained in electrified guide wire systems with a stronger magnetic field. For example, many current systems require the use of twelve different sensors in an array, such that the magnetic field strength from each sensor may be used to determine which sensors are over the path marker. Based on the determination of which of the twelve sensors are over the marker, the AGV's processing unit then determines the offset of the vehicle from the centerline of the magnetic marker path and adjusts the travel path of the AGV. The cost of these systems is increased due to the number of sensors used, and the amount of processing power required to process the twelve different signals. The AGV's cost is also increased in that typically at least two sensors are also used to detect stray, ambient, or background magnetic fields. The effectiveness of these background magnetic sensors is limited since these sensors only detect one component of the three components in the magnetic field.

Another problem with current magnetic sensor assemblies following a passive and continuous magnetic marker is that the algebraic relationship used to calculate the location of the AGV is not only sensitive to the width of the marker, but also the height of the sensor from the magnetic marker. As such, minor deviations in the width of the marker or height of the sensor on the AGV may cause variations in locating a magnetic marker. As the height of the sensor from the magnetic marker is required in calculating the position of the magnetic marker, it is very important that the height of the sensor assembly during the assembly of the AGV precisely matches the specified height, raising costs of assembly or requiring specific calibration of each AGV in relation to height. The requirement for the height to be precisely known is also problematic as it may vary depending on the amount of load the AGV is carrying or due to the variations in the floor of the facility. Additionally, the requirement for the width of the magnetic marker to be consistent over its entire length is problematic. For example, if magnetic paint is used, it is possible for variations in width to occur over the miles of routes typically found in a facility, especially over time in view of the wear caused by the AGVs and other vehicles and people continually passing over the magnetic marker.

Similar to the above described system and method, other magnetic systems and methods have been developed wherein at least two sensors are placed a known distance apart on the AGV and angled such that their sense axes meet at approximately the location of the centerline of the magnetic tape, if the AGV is centered along the magnetic marker. This method is also subjective to ambient magnetic fields, the width of the magnetic tape as well as the height of the vehicle, similar to a sensor directly placed over the center of the marker. Very careful alignment and calibration is also required to ensure precise and accurate guidance by the AGV as well as high precision during manufacturing regarding the height of the sensor assembly, the distance apart of the two magnetic sensors, and relative angles of the sensors.

SUMMARY OF THE INVENTION

The present invention is directed to an apparatus and method for guiding an AGV along a magnetic pathway and more specifically to an apparatus and a method capable of accurately and precisely following a weak magnetic field emitted by a substantially continuous passive magnetic marker having route junctions.

The present invention is further directed to an AGV configured to travel on a supporting surface and follow a pathway producing a magnetic field. The AGV includes a support assembly having a plurality of wheels and wherein at least one of the plurality of wheels is configured to directionally steer the AGV, and a first magnetic sensor assembly coupled to the support assembly. The magnetic sensor assembly has a first magnetic field detector arranged adjacent to a second magnetic field detector and the first magnetic field detector is configured to measure the strength of the magnetic field produced by the pathway along a first axis and output a first signal related to the magnetic field strength along the first axis of the first magnetic field detector. The second magnetic field detector is configured to measure the strength of a magnetic field along a second axis and output a second signal related to the magnetic field strength along the second axis. The first axis of the first magnetic field detector is orthogonal to the second axis of the second magnetic field detector.

The AGV further includes a controller capable of receiving the first and second signals and based on the first and second signals, capable of determining a steering signal to provide to the at least one of the plurality of wheels configured to directionally steer the AGV.

At least one of the first axis and second axis is approximately perpendicular to the supporting surface and the other of the first axis and second axis is approximately aligned with the supporting surface. In addition, each of the first axis and the second axis are preferably located within a first plane that is located approximately perpendicular to the supporting surface. The first plane is also approximately perpendicular to the pathway.

The AGV may include a second magnetic sensor assembly coupled to the support assembly. Similar to the first magnetic sensor assembly, the second magnetic sensor assembly includes a third magnetic field detector and a fourth magnetic field detector, each having an axis and wherein the axes of the third and fourth magnetic field detectors are orthogonal and are located preferably within a second plane. In addition, each of the first axis and the second axis are substantially located within a first plane that is located perpendicular to the supporting surface and wherein the second plane is approximately aligned with or within the first plane.

The field detectors are selected from either hall effect sensors or giant magnetoresistance sensors. It is expected that the first and second sensors are located adjacent to each other on a single chip and approximately aligned with the supporting surface.

A third magnetic sensor assembly may be coupled to the support assembly. The third magnetic sensor assembly includes a fifth magnetic field detector and a sixth magnetic field detector, each having an axis and wherein the axes of the fifth and sixth magnetic field detectors are orthogonal and located substantially within the a third plane. The axes of the first, third and fifth field detectors are also preferably aligned and the axes of the second, fourth and sixth field detectors are spaced apart and preferably parallel. In addition, the first, second and third planes are preferably aligned or within the same plane.

The present invention also relates to a method of controlling an AGV operating on a supporting surface and along a pathway producing a magnetic field and wherein the pathway is substantially continuous. The method includes the steps of determining the strength of the magnetic field along a first axis; determining the strength of the magnetic field along a second axis, wherein the second axis is orthogonal to the first axis; calculating a first vector directed at the pathway using the determined strength of the magnetic field along the first axis and the determined strength of the magnetic field along the second axis; and determining that the determined strength of the magnetic field along at least one of the first axis and the second axis exceeds a baseline strength.

The method may further include the step of comparing deviation of the angle of the calculated vector to a reference vector angle. If the AGV includes additional field detectors or sensor assemblies, the method may include the steps of determining the strength of the magnetic field along a third axis; determining the strength of the magnetic field along a fourth axis, wherein the fourth axis is orthogonal to the third axis; and calculating a second vector directed at the pathway using the determined strength of the magnetic field along the third axis and the determined strength of the magnetic field along the fourth axis. The point of convergence of the first and second, as well as any additional vectors may be calculated. The method then determines if the point of convergence of the first vector and the second vector is within a predetermined range of the supporting surface.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
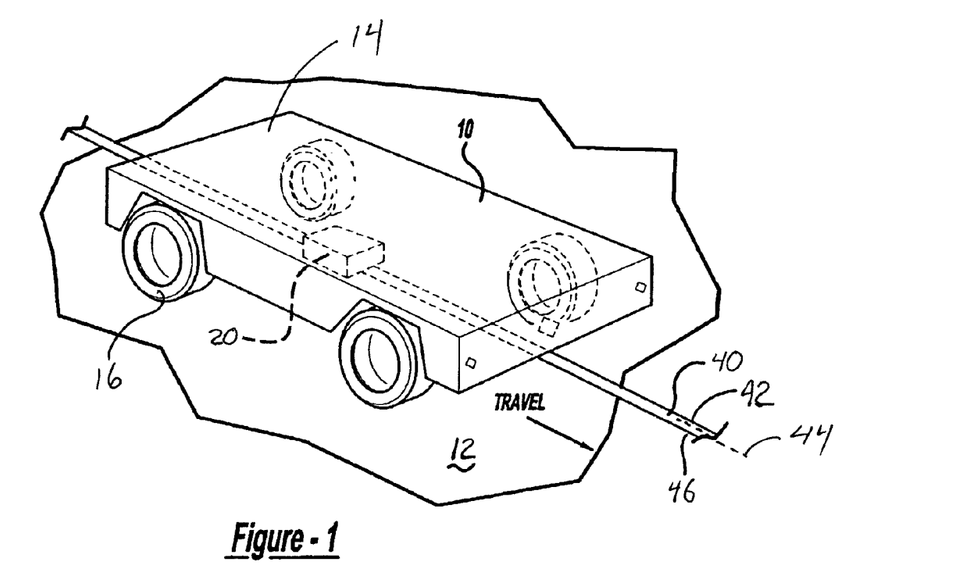
FIG. 1 is a perspective view of an AGV positioned in operative alignment with a magnetic marker on the floor and the magnetic sensor assembly in an exemplary position.
Figure 2:
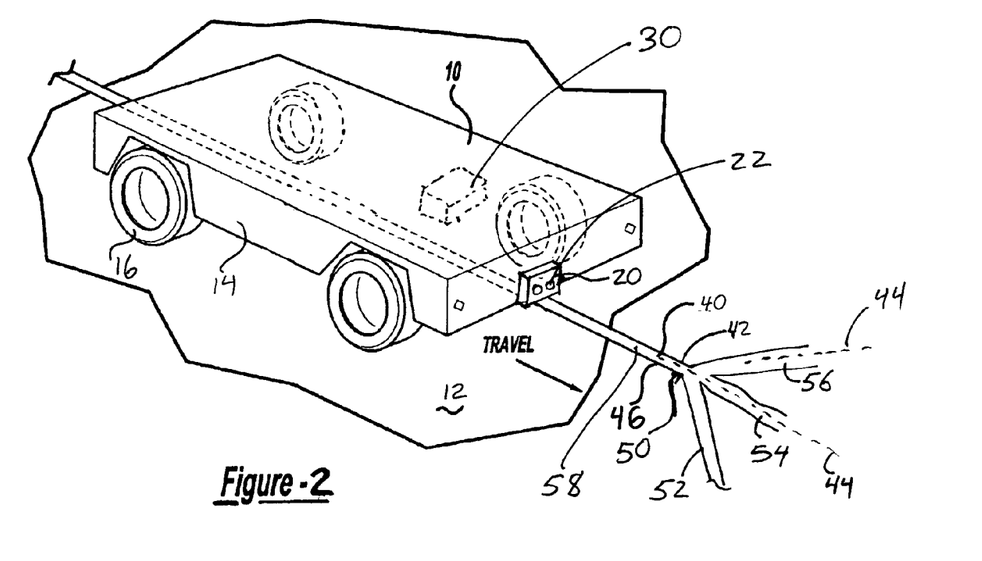
FIG. 2 is a perspective view of an AGV positioned in operative alignment with a magnetic marker on the floor and approaching divergent route junction with a magnetic sensor assembly exemplarily positioned on the front of the AGV.
Figure 3:
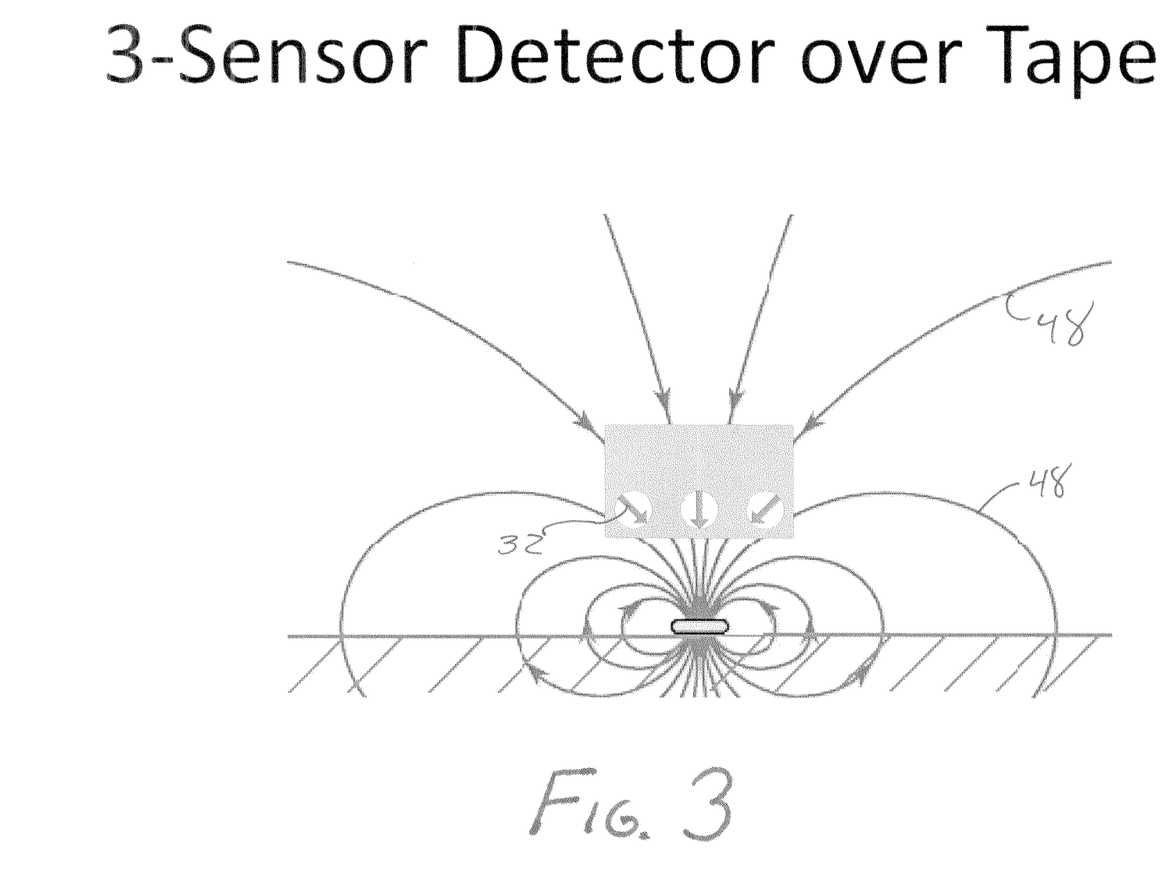
FIG. 3 is an exemplary schematic view of an AGV with three magnetic sensor assemblies centered over the magnetic marker and illustrating the determined vectors.
Figure 4:
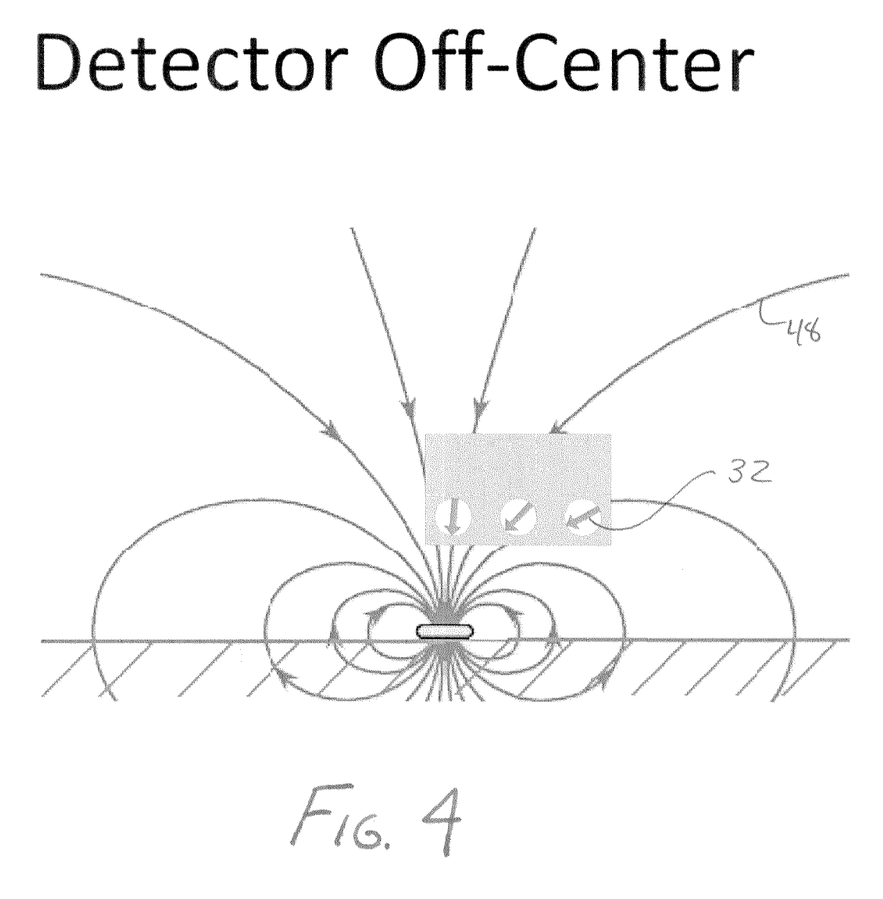
FIG. 4 is a schematic exemplary view of an AGV with three magnetic sensor assemblies offset to a first side of the magnetic marker and illustrating the position of the determined vectors for each sensor assembly.
Figure 5:
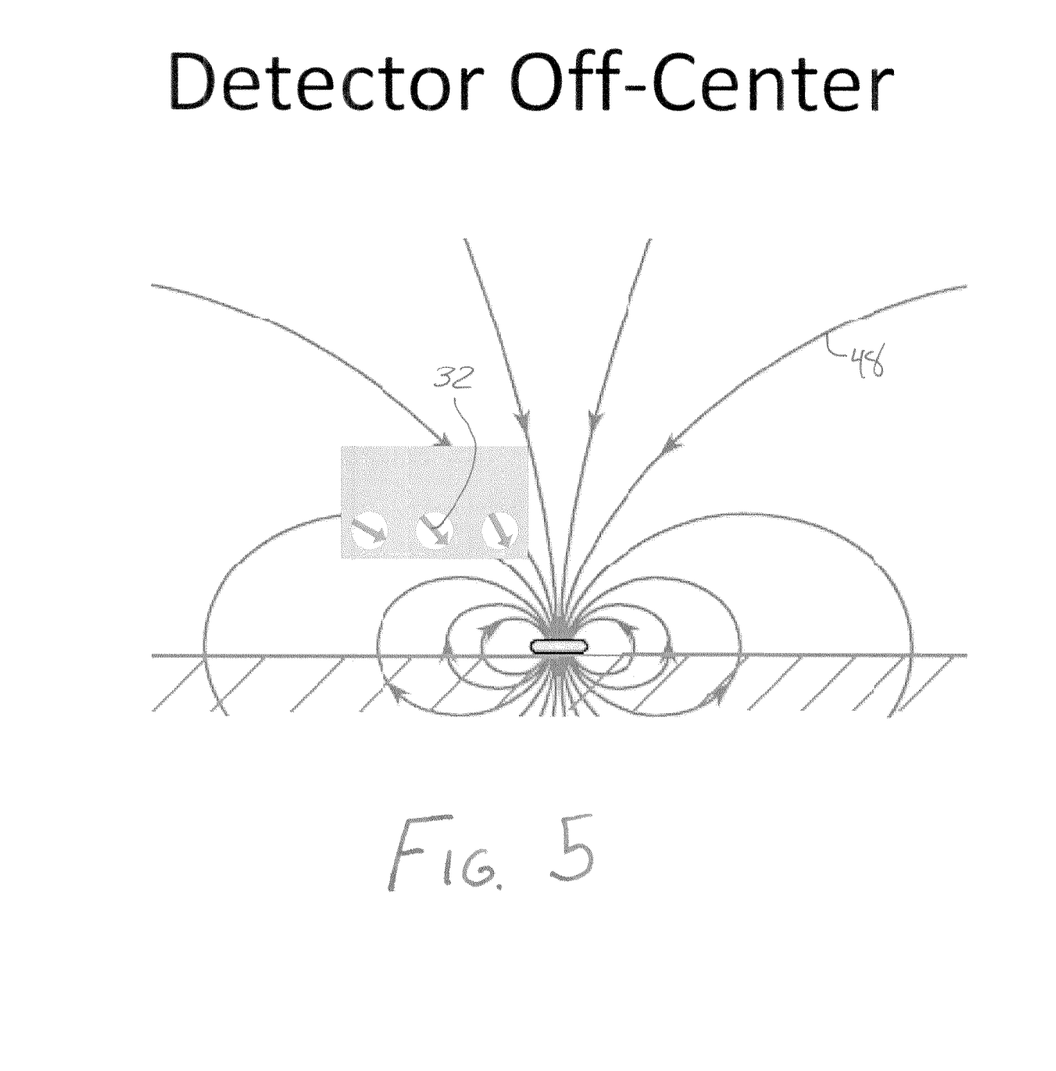
FIG. 5 is a schematic exemplary view of an AGV with three magnetic sensor assemblies offset to a second side of the magnetic marker and illustrating the corresponding determined vectors for each sensor assembly.

The present invention is directed to an AGV 10 capable of following a magnetic marker 20 along predetermined routes within a facility, and a related method for determining position of the magnetic marker 20 relative to the AGV 10 and correcting the actual travel path of the AGV to match a desired travel path aligned with the magnetic marker 20. The AGV 10 is generally illustrated in FIGS. 1 and 2 and may be formed in any size, shape, style, type, or configuration of a vehicle that is capable of driving along predetermined routes without a human operator. The AGV 10 may vary from small automatic carts up to large vehicles capable of carrying many of tons of material.

The magnetic sensor assembly 20 includes at least two magnetic field sensors or detectors 22 having orthogonal sense axes. The magnetic sensor assembly 20 includes or is in contact with a controller 30 on the AGV 10. The controller 30, which receives input from the magnetic field sensors 22, processes such input to determine the location of the AGV 10 relative to the magnetic marker 40, and provides steering and course adjustments to follow the magnetic marker 40. The sensor assembly 20 and controller 30 are also configured to accurately follow divergent paths at junctions 50 in the magnetic marker 40. The controller 30 provides signals or control outputs to the wheels or steering assembly relating to course corrections that were determined from processing signals regarding the magnetic field of the magnetic marker 40. The control 30 outputs are used in steering the AGV 10 to ensure that the actual travel path is substantially the same as the desired travel path, typically centered along the magnetic marker 40.

The AGV 10 generally includes a supporting frame body or assembly 14 to which a plurality of wheels 16 are attached as well as a guidance system having a magnetic sensor assembly 20 and a controller 30. The guidance system will have the ability through any known technique to provide steering and directional control to or through the wheels 16. The magnetic sensor assembly 20 generally includes at least two magnetic field detectors 22 capable in combination of allowing the controller 20 to determine at least one vector in the direction of a magnetic marker 40. The operating environment of the AGV 10 may be any environment in which the supporting surface 12, such as a floor of a manufacturing facility, is capable of including a magnetic marker 40 that defines a pathway.

Figure 8:
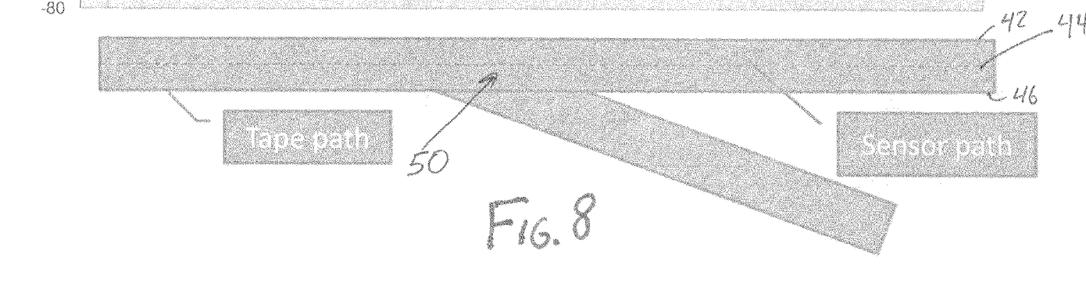
FIG. 8 illustrates the tape path of a divergent route junction with a left path being followed and the relative degrees of the individual sensors from a three-part sensor detector.

The magnetic marker 40 is generally desired to be continuous although unintended or intentional small gaps may be included, such as those occurring from wear over time in a facility, e.g., displacement of magnetic tape or magnetic paint from high traffic areas. Use of a continuous magnetic marker allows substantially constant sensing of the magnetic field by the magnetic sensor assembly 20. The magnetic marker 40 may be any type of elongated, substantially continuous material or item with minimal breaks or gaps applied to or set within the supporting surface 12 of the facility. Of course, even though not preferred, the present invention allows AGVs 10 to also work with electrified guide wire systems which is useful for facilities already having electrified guide wires. It is expected that for ease of installation, ease of repair, and ease of route changes that materials similar in application to magnetic tape and magnetic paint will primarily be used. In the case of magnetic tape, paint or the like, the magnetic marker 40 generally includes a first edge 42, a center 44, and a second edge 46. The magnetic marker 40 emits a magnetic field 48 similar to that illustrated in FIGS. 3-6. While the magnetic sensor assembly 20 specifically does not track the edges 42, 46 of the magnetic marker 40, it is configured to use the magnetic field 48 to determine approximately the center 44 of the magnetic marker 40. Variations in the width of the magnetic marker 40 are not an issue for the present invention, as the width of the magnetic marker 40 is not used in any of the steps of determining the location of the magnetic marker 40. The magnetic marker 40 may be routed through the facility around equipment, storage racks, machinery, and the like to provide the desired functions throughout the facility. As such, the magnetic marker 40 at times will need to include junctions 50 such as illustrated in FIGS. 2 and 8, specifically including a first path 52 and a second path 54 and at times, a third path 56, or additional paths as desired. Therefore, the AGV 10 may follow the original path 58 of the magnetic marker 40 to the junction 50 wherein the preprogrammed route of which path 52, 54, 56 it is to follow is used in evaluating the magnetic fields 48 related to the junction.

As discussed above, the structure of the AGV 10 may be of any size, shape, type, or configuration. For example, the AGV 10 may be a loader, hi-lo, or other material handling vehicle. Depending upon the desired AGV 10 configuration, the number and orientation of the wheels 16 may vary. Typically, the AGV 10 will have at least three or more wheels, preferably in most embodiments, four or more wheels. At least one or two of the wheels 16 will be directional wheels for steering input received from the controller to provide the directional control of the AGV 10. However, in some embodiments, the directional control of the AGV may be provided through skid steer control wherein wheels 16 on one side of AGV 10 rotate either faster or slower than the wheels 16 on the other side of the AGV causing the AGV 10 to turn. The configuration of the wheels 16 may vary depending upon the type of facility and supporting surface 12 on which the AGV 10 operates.

The support structure, frame, or body 14 of the AGV 10 may also be formed in any size, shape, type or configuration and typically will vary depending upon the desired functional task to be performed by the AGV 10. The AGV 10 includes, mounted to support structure or frame either directly or indirectly, the guidance system which typically includes magnetic sensor assembly 20, controller or processor 30 and though not illustrated, the steering control for the wheels 16.

The guidance system receives an input of magnetic field strength in certain directions, which is then provided to a controller or processor 30 to determine the exact location of the magnetic marker 40 and whether the AGV needs to make course corrections. The magnetic sensor assembly 20 generally includes the magnetic field sensors or detectors 22. At least two magnetic field detectors 22 are included in the magnetic sensor assembly 20 and while the invention only needs one assembly 20 having two detectors 22, most of the figures illustrate three magnetic sensory assemblies 20 having each at least two detectors 22. Exemplary magnetic field detectors 22 may be hall effect sensors or giant magnetoresistance sensors. Of course, any other sensor capable of providing the necessary information as described below, specifically relating to the ability to determine the vector from the strength of the magnetic field along orthogonal axes, may be used in the present invention. The hall effect sensors or giant magnetoresistance sensors should be configured or designed for low field magnetic sensing unless the AGV is used with an electrified guide wire system. The detectors 22 are arranged with at least two sense axes being orthogonal. To maintain the orthogonal relationship between the two axes of the sensors and limit installation costs, it is preferable that the at least two detectors 22 are on a single chip. The use of hall effect sensors on the same chip allows for advantages over coil based magnetic sensors in that they are extremely sensitive to low field magnitudes, such as from 120 microgauss to 6 gauss and are solid-state magnetic sensors. Of course, more than two detectors 22 could be included on a single chip on the AGV 10 and multiple magnetic sensor assemblies 20 may be used, each having at least two sensors 22, and more specifically, each with at least two of the detectors 22 having orthogonal axes. The chips, including the detectors 22, can be very small and the present invention, by using two magnetic sensors on the same chip with orthogonal sensing axes, eliminates the need of the prior art for precise displacement a certain distance to each side of the magnetic marker of the sensors. The present invention also eliminates the prior art requirement that the sensors be a certain height away from the magnetic marker, except that it is desirable for the mounting height to be greater than the width of the magnetic marker to ensure accuracy of the determined vectors. As discussed in the background, in the prior art, magnetic sensors usually need to be carefully centered or placed a careful distance from each other to each side of the centerline of the AGV as well as a very specific distance from the supporting surface and changes in load weight at times cause variance in this distance, thereby reducing the effectiveness and accuracy of the prior sensor arrangements.

Giant magnetoresistance sensors typically use thin film structures composed of alternating ferrous magnetic layers and non-magnetic layers. The magnetic field 48 is typically measured as a change in the electrical resistance depending on whether the magnetization of an adjacent ferrous magnetic layer is in parallel or anti-parallel alignment. More specifically, the overall resistance may be relatively low for parallel alignment and relatively high for anti-parallel alignment. Spacer material, such as copper, is interspaced as the non-magnetic layer between the ferrous magnetic layers which may be an iron or an iron alloy such as a nickel iron.

The magnetic sensor assembly 20 may be located anywhere desired on the AGV 10. However, it is typically believed that for improved reaction times and ease of controlling the direction of the AGV as well as ease of access to the magnetic sensor assembly 20 that the sensor assembly 20 preferably is orientated in the direction of travel. However, for some AGVs 10 that commonly switch between directions of travel, it may be desired to locate it closer to the center of the AGV, such as illustrated in FIG. 1 or use two different placements for sensor assemblies on the AGV. As such, the magnetic sensor assembly 20 can be located anywhere on the AGV so long as it is in a serviceable position, preferably along the centerline of the AGV and its ability to sense the magnetic field produced by the magnetic marker 40 is not adversely affected by such placement. Of course, the sensor assembly 20 may be offset from the center line of the AGV 10, so long as the controller knows the approximate envelope of the AGV 10 on each side of the sensor, to avoid collisions and ensure proper guidance of the AGV 10.

Figure 9:
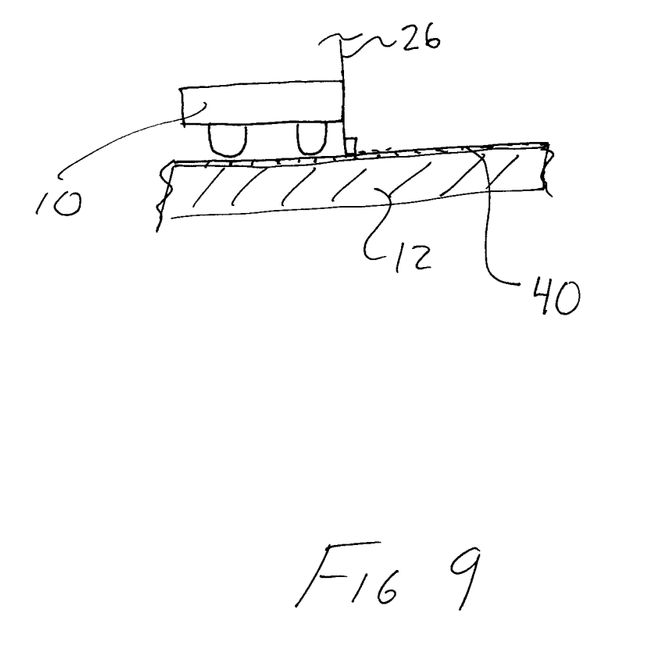
FIG. 9 is a side view schematic representation of the plane in which the detectors sit versus the plane in which the magnetic marker is located.
Figure 10:
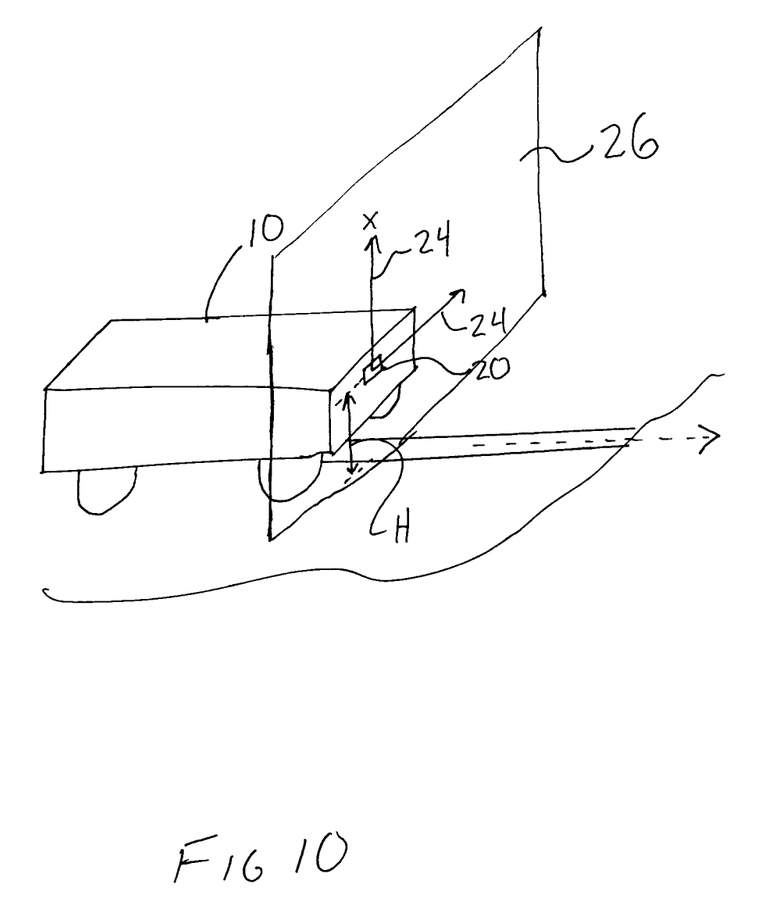
FIG. 10 is a schematic representation of the sense axes for the two orthogonal detectors in a sensor assembly on an AGV.

The orientation of the sense axes 24 of the individual detectors 22 that form the sensor assembly 20 are preferably in the same plane 26, orthogonal to each other with the individual detectors 22 as illustrated in FIG. 10 and arranged approximately along a line. The detectors 22 are typically arranged along a line approximately parallel to the supporting surface 16, but preferably perpendicular to the direction of travel as well as the centerline 44 of the magnetic marker 40. Such an arrangement of the magnetic sensors 22 puts the sensors 22 at an approximate uniform height above the supporting the surface 16. FIGS. 3-6 illustrate the vector positions 32 determined by the controller 30 reading the signals and do not represent the sensor axes of the individual detectors 22. These figures also illustrate the multiple sensor assemblies 20 being substantially aligned. A specific orientation of each detector 22 is such that the axes of at least two of the detectors are orthogonal to each other. Also, so long as the sense axes are orthogonal to each other, the vector analysis as described below may be performed, such that the exact orientation of the sense axes relative to the supporting surface for the magnetic marker may be determined. More specifically, because the present invention uses a novel vector analysis to determine the location of the magnetic marker 40 with orthogonally orientated sense axes of at least two detectors 22, the vectors will always point to the centerline of the magnetic marker 40 and as such, the position and height relative to the supporting surface 12 have little effect or may be accounted for by the controller 30. In addition, even though the present invention describes the orientation of at least one sense axis perpendicular to the floor and one sense axis parallel to the floor, the present invention through its use of vectors can adjust easily for other alignments as the vector always points to the center of the magnetic marker no matter the orientation, however the at least two sense axes are perpendicular. If the sense axes 24 are not aligned as described above relative to the supporting surface and marker 40, the AGV 10 will need to be calibrated to automatically adjust for a vector that while it points to the centerline of the marker 40 would not center the AGV 10 over the marker 40 due to the misalignment of the sensor axes 24, as described below in greater detail. Of course, it is also preferable that the plane containing the sense axes be approximately perpendicular to the magnetic marker 40. In addition, to ensure consistent and uniform measurement of the magnetic field to determine a vector, it is preferable that the sensors having orthogonal axes be directly adjacent to each other as any significant spacing could cause different readings and thereby reduce accuracy of the vector. More specifically as the strength of the magnetic field is measured along two orthogonal axes, any displacement other than adjacent may reduce the accuracy of the system. For ease of use, it is expected that the magnetic sensor assembly 20 will be installed on the AGV such that one of the sense axes 24 from a first detector 22 is perpendicular to the supporting surface 12 while the other sense axes 24 is parallel to the supporting surface 12 and with a two sense axes being orthogonal to each other and located in a single plane. Of course, minor variations in the orientation of the sense axes as well as orientation of the sensor assembly 20 may be allowed without need for calibration, however, these are expected to be minimized. FIGS. 9 and 10 illustrate direction of the sense axes relative to the AGV as well as the supporting surface 12.

The present invention needs little to no calibration in comparison to AGVs of the prior art. Previously, AGVs required very specific and critical placement of the magnetic sensor assembly in height over the floor as well as the location of any sensors from each other, and the width of the marker 40. More specifically, prior methods to determine a magnetic pathway required the determination of a linear offset of the sensor from the magnetic marker 40 and such calculation of the offset requires that the controller have information about the expected, precise distance of the magnetic sensor to the marker and width of the magnetic marker at that spot. Any misadjustment of the sensor or variations in the magnetic marker or supporting surface, as well as variations in height of the sensor due to the amount of load being transported, would cause error in the height of the AGV body and thereby cause errors in locating the magnetic marker. Because the present invention uses vectors and measures the angle of the vectors as well the magnitude, path offset or height information is not required, and no matter where the sensor assembly 20 is located on the AGV, the magnetic marker 40 is accurately and precisely found.

The present invention also allows relatively easy insertion of an AGV onto the magnetic marker path. The present invention does not require careful insertion and alignment, but instead an AGV is simply placed on the path and pointed roughly in the required direction. The algorithm and steering mechanism work to rapidly acquire tracking of the magnetic marker in an accurate and precise fashion, and guide the AGV along the magnetic marker 40.

The only requirement regarding placement of the magnetic sensor assembly 20 is that the height of the detector 22 must be adequate to detect the magnetic field. Also, while the present invention is not sensitive to variations in the width of the marker or the distance between the detector 22 and the marker, the width of the marker needs to be narrow enough to define an unambiguous pathway, particularly in areas with junctions. As the width of the magnetic marker increases, the present invention generally requires an increase in height of the sensor assembly from the supporting surface to accurately and precisely determine the centerline of the marker, but the controller does not use this height in any calculations. Therefore, the height is at least greater than the widest point of the magnetic marker. Conversely, the height should be limited as the strength of the magnetic field generally decreases as the distance increases. In addition, as the height increases the same displacement of the AGV 10 in position from the center of the maker 40 causes decreasing amounts of measured angle of deviation from the expected vector direction.

The sensor assembly 20 includes the magnetic field detectors 22 with their axes 24 in a single plane 26 and aligned orthogonal or substantially perpendicular to each other. An orthogonal alignment of the detectors 22 is used in the determination of a vector pointing to the center of the magnetic marker 40. More specifically, the magnetic sensor assembly 20 includes magnetic field sensors or detectors 22 which send data relating to at least two orthogonal components of the magnetic field to the controller 30 to determine the vector direction and strength of the magnetic field in the plane of the sensors. As stated above, the axes 24 of the detectors 22 fall substantially within a single plane 26 and include typically one perpendicular to the supporting surface 10 as well as the magnetic marker 40 and one parallel to the supporting surface, but perpendicular to the centerline of the magnetic marker 40. Therefore, each detector 22 detects the strength of the magnetic field in the direction of its axis 24. Using the vector analysis described below, the processor 30 is able to determine the direction of the magnetic field in the plane 26 containing each sensors axis 24.

To ensure that the AGV 10 is reading a magnetic field emanating from a magnetic marker 40 and not background magnetic fields, the AGV 10 requires the magnitude of the magnetic field to exceed a baseline strength of at least one of the magnetic field detectors or sensors 22. For example, the system is configured so that the Earth's magnetic field does not affect or has only a minimal affect on locating the marker 40. More specifically, the system requires at least one detector 22 to have a minimum magnetic strength level that eliminates the potential issue of an AGV displaced from the magnetic marker 40 traveling freely using the Earth's magnetic field. In addition, some supporting surfaces 12 may include materials that have magnetic properties which may emit a stronger magnetic field than the Earth's magnetic field, such that they may be measurable along the AGV's route. For example, a concrete floor may include various rocks having magnetic properties that may be unevenly dispersed throughout the floor. These typically only have low strength magnetic fields emanating therefrom and as such requiring at least one of the detectors 22 to have a minimum threshold of magnetic strength along its axis 24 eliminates most issues. Therefore, the potential for misguidance due to variations in the magnetic properties of the supporting surface 12 is reduced.

In addition, the vector analysis of the present invention include methods for dealing with ambient magnetic fields as well as variations in the magnetic field, such as due to variations in the magnetic properties of the floor or even magnetic fields produced by industrial machinery in the facility in which the AGV operates. Previously, in facilities that processed materials or had industrial processes that caused magnetic fields, such as machines using significant amounts of power, the magnetic fields emanating from these machines and supporting surfaces could confuse the magnetic sensors on the AGVs. Therefore, AGVs using magnetic guidance systems had limitations of what types of facilities or around what types equipment or machinery the AGV could operate. In the prior art, there is no sufficient method for easily determining if something other than the magnetic marker is affecting the AGV's determination of its present location, relative to the magnetic marker. Because the present invention uses a vector analysis, determining errors due to magnetic fields emanating from other than the magnetic marker are easily determined. First, because the present invention uses determined vectors in guiding the AGVs, the AGV can be programmed to stop if the vector is pointing in a direction outside a specified predetermined range. For example, a temporary large magnetic field generated by an industrial process may cause the vector to point almost sideways, which the controller could easily determine to be an invalid reading and stop operation of the AGV. Second, through the use of two spaced apart sensor assemblies 20 having each two detectors 22 with orthogonal sense axes 24, the controller 30 can determine the point of vector convergence or intersection as an error check.

Figure 6:
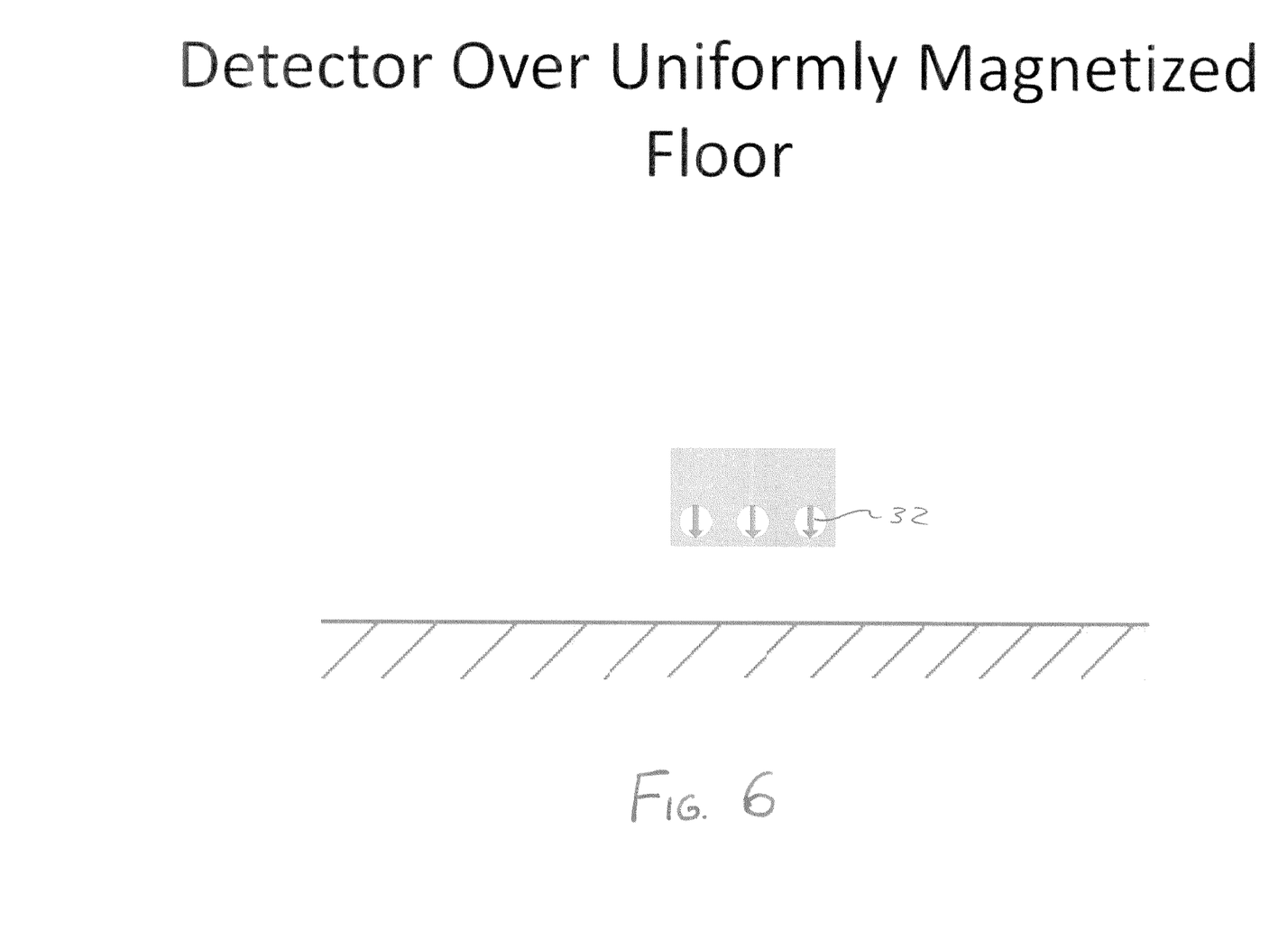
FIG. 6 illustrates the vector positions of a three-part sensor assembly when positioned over a uniformly magnetized floor.
Figure 7:
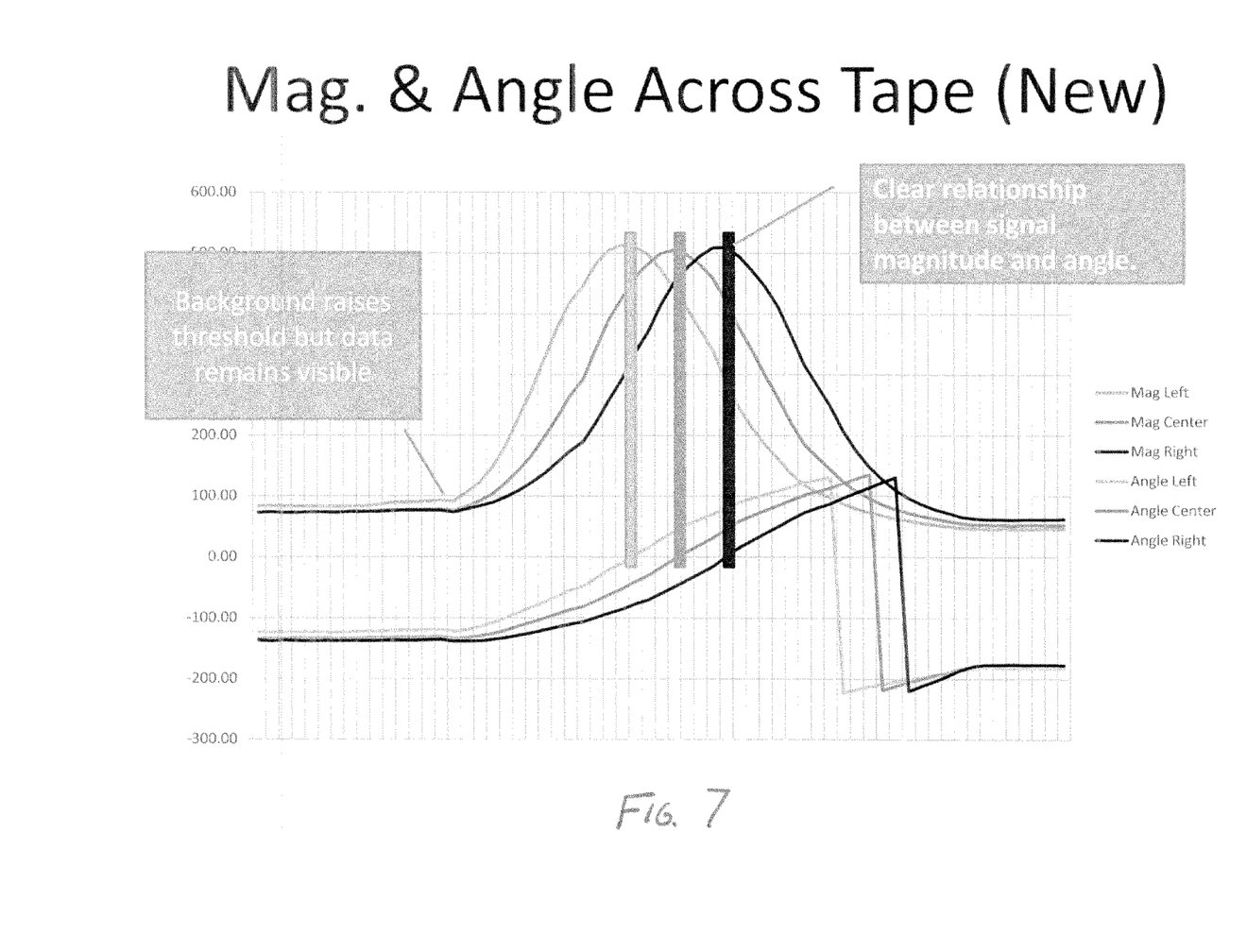
FIG. 7 illustrates the data received from the magnetic detectors in a sensor assembly as the AGV travels along a path and the relationship between the angle of detection as well as the magnitude of the magnetic strength.

The vector associated with each sensor assembly 20 is determined using each of the detectors 22 and the controller 30 analyzes at least two vectors to determine a point of convergence of the vectors. Therefore, not only may error checks be performed using individual vectors 32, but if the height is approximately known to the magnetic marker 40, the point of convergence should approximate the distance to the magnetic marker 40. More specifically, two magnetic sensor assemblies 20 each having at least two magnetic field detectors 22 with their axes orthogonal to each other are used. The processor or controller 30 determines the vector related to each magnetic sensor assembly 20 and the direction indicated by each vector should converge on the center of the marker. Therefore, the controller can use the signals to analyze the vectors for convergence and in the presence of distributed background magnetism that is substantially uniform, the marker 40 will still be the point of convergence of the vectors. In comparison, upon receiving an unexpected result, such as the point of convergence for multiple sensors is not logically the magnetic marker, the AGV can stop operation. Examples of points of convergence determined as incorrect include when the point of convergence is displaced higher than the plane of the supporting surface 12 or substantially below the supporting surface. The point of convergence must be below or above the surface by at least a specified amount or predetermined range, before the AGV is instructed to stop. In some circumstances, if the vectors are determined to not converge, then the controller also would stop the AGV. This point of convergence allows for a quick and easy determination that the magnetic sensor assembly 20 as well as the controller 30 is operating accurately and precisely to locate the magnetic marker 40 so that the guidance system may match the actual travel path of the AGV 10 to the desired travel path of the AGV along the magnetic marker. An example of magnetic detectors 22 having vectors 32 that do not converge would be in areas of a supporting surface where the magnetic field of the supporting surface is greater than or sufficient in strength to confuse the magnetic sensor assemblies. For example, an area of the supporting surface having a strong magnetic field may cause the vectors to point straight down as illustrated in FIG. 6 such that they will not converge. Of course, when using the point of convergence as an error check, the height of the detector 22 from the magnetic marker 40 is approximately used by the controller, but is not used for location, and is specifically not used in calculating the vectors 32.

Although the present invention is configured such that maps of the facility and routes are not needed, a technician during the calibration process of the AGV may in some instances, where the supporting surface 12 is problematic with stray or ambient magnetic fields, map the AGV 10 along the magnetic path to determine problem areas. These problem areas are then identified and can be adjusted for when operating the AGV. For example, if one particular piece of industrial equipment emanates a strong magnetic field such that the AGV as it approaches the industrial equipment and has the vectors pointing at the piece of equipment versus the magnetic marker 40, use of stored map allows the AGV to adjust for this background magnetic field and properly follow the magnetic marker 40. Because the present invention uses vector directions to determine location of the marker 40, it eliminates the issues of the prior art in which when the strength of the background magnetism is larger than the threshold for detecting off marker condition, and the AGV believes that it is on the correct path, even though it is not following the marker.

The present invention determines a vector output by each magnetic sensor assembly 20 having at least two magnetic sensors or detectors 22. This is determined by taking the strength of the magnetic field along one axis 24 and combining it, using an algorithm, with a strength of the magnetic field along the second axis 24, which is orthogonal to the first axis and then calculating a vector. More specifically, the vector's direction is given by:

$$\text{Angle} = \text{offset} + \text{ARCCOS}(\text{Signal } A/\text{Signal } B) \quad (1)$$

The offset is a constant based upon the rotational orientation of the sensors. Therefore, if the sensors are not orthogonally aligned such that in the illustrated examples, one is perpendicular to the floor with its axis and the other axis is parallel to the floor, the offset allows for an adjustment. The offset also allows for differences in the manufacturing process of the AGV 10 so that the AGV 10 can be calibrated to ensure accurate and precise tracking of the magnetic marker 40. It is important to note that the offset is a constant based upon the rotational orientation of the detectors 22 specifically their axes 24 relative to each other and not the deviations in side-to-side in location on the AGV. It should be noted that in some embodiments an AGV could also be configured not to follow the line along the center of the AGV, but for example follow a line offset from center about 25% to one side of the AGV, in which an additional offset variable would need to be added.

To ensure that the overall strength of the magnetic field is great enough, the field strength of the magnetic field is calculated. More specifically, the field strength is calculated as:

$$\text{FIELD STRENGTH} = \sqrt{(\text{signal}a)^2 + (\text{signal}b)^2} \quad (2)$$

Therefore, the vector indicates the direction to the center of the guidepath magnetic marker. If the AGV is directly over the marker 40, and if the magnetic sensor assembly 20 is centered on the AGV, the vector is pointed directly perpendicular to the floor 12. As stated above, if the magnetic sensor assembly 20 is intentionally offset from the center of the AGV, yet the AGV is to follow the magnetic marker along the center of the AGV, an additional offset can be added to the formula to adjust for the variance of the vector from pointing directly perpendicular to the floor 12 to pointing at a particular angle. In fact, such an additional offset is just a simple adjustment to the expected angle. When the vehicle is offset from the magnetic marker 40 and it is desirable to resume precise and accurate tracking, for a centered sensor assembly 20, the vector will have an angle that is not perpendicular to the floor, the AGV is then steered to align the vector to be perpendicular to the supporting surface 12. Of course, if the magnetic sensor assembly 20 is intentionally configured to not be directly over the magnetic marker, any deviation from the expected vector angle will be noted as an error in position so that after correction of the location of the AGV, with the AGV centered over the magnetic marker, the vector 32 will have the assigned angle. The magnetic sensor assembly 20 provides output to the controller 30 which calculates the vector 32 as well as field strength. The controller 30 in processing the angle of each vector 32 computes an angle error proportional to the difference between the measured angle and the desired angle, which is typically perpendicular. The controller 30 uses that angle error signal to determine a steering control signal which is sent to the vehicle's steering system. The controller 30 adjusts the steering to keep the vector 32 pointed at the desired angle, which is typically perpendicular to the floor.

The present invention allows for easy following of a desired passive magnetic marker pathway even when the pathway includes divergence or junctions in the pathway. At a divergence, if the AGV needs to follow a track to either the left, right or center of the marker. If the AGV follows a marker to the left of center, the AGV will follow the left divergence of the path compared to the right of center or center of the path.

To follow an exemplary left divergence at a junction, the control 30 subtracts the angle of the magnetic field sensor from a reference angle to the right of center to calculate the error angle. The controller then controls the steering to minimize the error signal. The effect is that the AGV may look off to the right to see the path yet keeping the vehicle to the left. A similar process is used for the right divergence.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An automatic guided vehicle (AGV) configured to travel on a supporting surface and follow a pathway producing a magnetic field, said AGV comprising:
   a support assembly having a plurality of wheels and wherein at least one of said plurality of wheels is configured to directionally steer the AGV;
   a first magnetic sensor assembly coupled to said support assembly, said magnetic sensor assembly having a first magnetic field detector arranged adjacent to a second magnetic field detector and wherein said first magnetic field detector is configured to measure the strength of the magnetic field produced by the pathway along a first axis and output a first signal related to the magnetic field strength along said first axis of said first magnetic field detector and said second magnetic field detector is configured to measure the strength of a magnetic field along a second axis and output a second signal related to the magnetic field strength along said second axis and wherein said first axis of the first magnetic field detector is orthogonal to said second axis of the second magnetic field detector; and
   a controller capable of receiving said first and second signals and based on said first and second signals, determining a steering signal to said at least one of said plurality of wheels configured to directionally steer the AGV;
   wherein said first and second magnetic field detectors are located adjacent to each other on a single chip and approximately aligned with the supporting surface.

2. The AGV of claim 1 wherein at least one of said first axis and second axis is substantially perpendicular to the supporting surface and the other of said first axis and second axis is substantially parallel to the supporting surface.

3. The AGV of claim 2 wherein each of said first axis and said second axis are substantially located within a first plane that is located substantially perpendicular to the supporting surface.

4. The AGV of claim 3 wherein said first plane is substantially perpendicular to the pathway.

5. The AGV of claim 1 further including a second magnetic sensor assembly coupled to said support assembly and wherein said second magnetic sensor assembly includes a third magnetic field detector and a fourth magnetic field detector, each having an axis and wherein said axes of said third and fourth magnetic field detectors are orthogonal and located substantially within a second plane.

6. The AGV of claim 5 wherein each of said first axis and said second axis are substantially located within a first plane that is located substantially perpendicular to the supporting surface and wherein said second plane is approximately aligned with or within said first plane.

7. The AGV of claim 1 wherein said field detectors are selected from the group consisting of hall effect sensors and giant magnetoresistance sensors.

8. The AGV of claim 1 further including a second magnetic sensor assembly coupled to said support assembly and wherein said second magnetic sensor assembly includes a third magnetic field detector and a fourth magnetic field detector, each having an axis and wherein said axes of said third and fourth magnetic field detectors are orthogonal and located substantially within the second plane, and a third magnetic sensor assembly coupled to said support assembly and wherein said third magnetic sensor assembly includes a fifth magnetic field detector and a sixth magnetic field detector, each having an axis and wherein said axes of said fifth and sixth magnetic field detectors are orthogonal and located substantially within a third plane, and wherein the axes of said first, third and fifth field detectors are substantially aligned and wherein the axes of said second, fourth and sixth field detectors are spaced apart and substantially parallel.

9. The AGV of claim 8 wherein said first, second and third planes are substantially aligned or within the same plane.

10. A method of controlling an AGV, operating on a supporting surface, along a pathway producing a magnetic field and wherein said pathway is substantially continuous, said method comprising the steps of:
   determining the strength of the magnetic field along a first axis;
   determining the strength of the magnetic field along a second axis, wherein said second axis is orthogonal to said first axis;
   calculating a first vector directed at the pathway using the determined strength of the magnetic field along the first axis and the determined strength of the magnetic field along the second axis;
   calculating a second vector directed at the pathway using the determined strength of the magnetic field along the first axis and the determined strength of the magnetic field along the second axis;
   determining a point of convergence of the first vector and the second vector; and
   determining if the point of convergence of the first vector and the second vector is within a predetermined range of the supporting surface.

11. The method of claim 10 further including the step of comparing deviation of the angle of the calculated vector to a reference vector angle.

12. The method of claim 10 further including the steps of:
   determining the strength of the magnetic field along a third axis;
   determining the strength of the magnetic field along a fourth axis, wherein said fourth axis is orthogonal to said third axis;
   calculating a second vector directed at the pathway using the determined strength of the magnetic field along the third axis and the determined strength of the magnetic field along the fourth axis.

13. The method of claim 10 further including the step of determining that the determined strength of the magnetic field along at least one of the first axis and the second axis exceeds a baseline strength.

14. The method of claim 10 further including the step of instructing the AGV to stop if the point of convergence is outside of the predetermined range of the supporting surface.

15. The method of claim 10 further including the step of correcting an actual travel path of the AGV to match a desired travel path aligned with the magnetic marker based on the direction of the first and second vectors.

* * * * *